United States Patent
Bigby et al.

(10) Patent No.: US 8,527,346 B2
(45) Date of Patent: Sep. 3, 2013

(54) METHOD AND SYSTEM FOR SCHEDULING ELECTRONIC ADVERTISING

(75) Inventors: Michael Bigby, San Jose, CA (US); Britton Glasser, San Francisco, CA (US); Adam Taisch, San Francisco, CA (US); Andy Atherton, San Francisco, CA (US); Harry Fung, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 3525 days.

(21) Appl. No.: 10/880,183

(22) Filed: Jun. 28, 2004

(65) Prior Publication Data
US 2007/0174114 A1    Jul. 26, 2007

Related U.S. Application Data

(60) Provisional application No. 60/507,031, filed on Sep. 29, 2003.

(51) Int. Cl.
*G06Q 30/00* (2012.01)
(52) U.S. Cl.
USPC ............ 705/14.61; 705/14.4; 705/14.48; 705/14.49; 705/14.52; 705/14.68
(58) Field of Classification Search
USPC .......... 705/14, 1–28, 14.1–14.28, 14.61, 705/14.4, 14.49, 14.48, 14.52, 14.68
See application file for complete search history.

(56) References Cited

U.S. PATENT DOCUMENTS

| | | | |
|---|---|---|---|
| 5,937,392 A | 8/1999 | Alberts | |
| 5,948,061 A | 9/1999 | Merriman et al. | |
| 7,260,783 B1 * | 8/2007 | Mika | 715/748 |
| 2003/0110171 A1 * | 6/2003 | Ozer et al. | 707/10 |
| 2004/0044571 A1 * | 3/2004 | Bronnimann et al. | 705/14 |

FOREIGN PATENT DOCUMENTS
WO    WO 01/39026 A2    5/2001

OTHER PUBLICATIONS

International Search Report of International Application No. PCT/US2004/031830 dated May 18, 2007.
Written Opinion of the International Searching Authority of International Application No. PCT/US2004/31830 dated May 18, 2007.
International Preliminary Report on Patentability of International Application No. PCT/US2004/031830 dated Jun. 5, 2007.

* cited by examiner

*Primary Examiner* — Scott D Gartland
(74) *Attorney, Agent, or Firm* — Brinks Hofer Gilson & Lione

(57) ABSTRACT

A method for scheduling advertising comprises the steps of: estimating a respective fraction of delivered advertisement impressions that result in a response from a user for each of a plurality of advertising contracts, estimating a value per impression for each of the advertising contracts, and scheduling an advertising line under the contract having the highest value per impression at a next available advertising window.

18 Claims, 6 Drawing Sheets

METHOD AND SYSTEM FOR SCHEDULING ELECTRONIC ADVERTISING

This application claims the benefit of U.S. Provisional Application No. 60/507,031, filed Sep. 29, 2003.

FIELD OF THE INVENTION

The present invention relates to methods and systems for scheduling advertising lines, and in particular for scheduling electronic advertising lines.

BACKGROUND

An electronic publisher treats the available advertising space as inventory.

As used herein, the term "inventory" can include available advertising space in a variety of media, including but not limited to web pages, portions of web pages, banners, buttons, pop-up windows, placement within sponsored search listings, and streaming media (including video and/or audio). Each time one of these advertisement types is played for or presented to a user constitutes an "impression." The inventory of advertising space includes the capacity to render advertising in any of these formats.

The term "advertising" as used herein is not limited to commercial advertising, but may also include any purchase of the ability to deliver information content of any type. For example, a public service notice or a pure entertainment streaming video that is purchased by a sponsor, but only delivers information to the recipient without asking the recipient to take any action or make any purchase would still be encompassed by the term "advertisement" as used herein.

A unit of delivery for advertising may be referred to as a line. A line refers to one particular set of creative expressions delivered over one particular period of time for a web site. A line is also a unit of purchase, so it has an associated particular rate or cost.

Advertising media inventory may be divided into two general classes. The first type is "guaranteed" (also called Class I). This inventory is generally paid for in advance and is guaranteed (by contract) to be delivered within a certain period. Because of this constraint, Class I inventory cannot be oversold, and an inventory management system exists to measure and regulate inventory availability. Class I inventory is generally sold to large, branding-oriented advertisers who need reliable delivery to achieve their marketing goals and are willing to pay premium prices for that inventory. Class I inventory is typically sold on a cost-per-impression (CPI) basis.

The second type of media inventory is "preemptible" or non-guaranteed (referred to herein as "Class II.") It comprises the remnant of available inventory after Class I is served. Class II advertising is generally paid for in arrears, because it can be preempted at the publisher's discretion without violating any contractual obligation. Class II inventory serves as a sink for excess supply and can be thought of as a "spot" or "auction" marketplace. This inventory is usually sold to smaller advertisers, often to direct marketers who wish to drive transactions rather than branding.

Class II inventory is most frequently sold on a performance basis, meaning that the advertiser pays based only in the event of a response to an ad, rather than just for placement of that ad. This performance basis adds uncertainty to the estimation of the value (on a per-impression basis) of a media purchase.

There are two general types of performance based advertising deals: "cost-per-click (CPC)" and "cost-per-acquisition (CPA)." Cost-per-click deals require the advertiser to pay the electronic publisher a fixed amount per click by an end user that sees or hears the advertisement. This cost-per-click is also called a "click bounty". (This requires the viewer to take an action, but does not necessarily require a purchase by the viewer to trigger an obligation for the advertiser to pay the publisher.) Cost-per-acquisition deals, on the other hand, require the advertiser to pay the electronic publisher a fixed amount per action that happens after the click. For example, an advertiser might pay a fixed bounty for each new membership to their site that was driven from the advertisement. The advertisement must actually be effective (in leading a viewer to purchase goods or services) in order to trigger an obligation for the advertiser to pay the publisher for the advertisement. This cost-per-acquisition is called an "acquisition bounty".

The prior art advertisement delivery system was designed for Class I inventory. The prior art system assumed that the sum of all the sales will be less than or equal to the available inventory. This is enforced by an inventory prediction system and scheduling system. In this environment, the ad server was designed to satisfy as many contracts as possible on schedule. Thus when selecting an ad, the ad server finds the set of all appropriate ads and chooses the one from the contract that is most behind on its delivery schedule. If no contracts are behind then no ad is chosen. Since the system constrains the sold inventory to less than or equal to 100%, this results in the most Class I contracts being satisfied on schedule.

In Class II advertising, it is to the publisher's disadvantage to limit contracts to only 100% of the available inventory. Also, because the contract allows the advertisement to be delayed (e.g., to service a more profitable advertiser), it is disadvantageous to always service a contract that is most behind on its delivery schedule.

The prior art electronic advertising environment required manual optimization of the preemptible inventory by removing low-value campaigns. This was complicated by the fact that optimal behavior required that orders be balanced with available inventory. Because Class 1 inventory fluctuates daily, this required unrealistic human maintenance effort and the inventory was frequently improperly scheduled.

In addition, estimations of the value of the Class II inventory were difficult and often incomplete. The Class II advertisers pay on a per-click or per-acquisition basis, but the advertisements must be scheduled on a per-impression basis. The number of impressions required to generate a desired number of clicks or acquisitions was not known. Schedulers would choose which contract to run based on criteria such as client size, relationships with sales people, or the like. This frequently led to an inappropriate mix of contracts being scheduled.

An improved system to scheduling electronic advertisements is desired.

SUMMARY OF THE INVENTION

A method for scheduling advertising comprises the steps of: estimating a respective fraction of delivered advertisement impressions that result in a response from a user for each of a plurality of advertising contracts, estimating a value per impression for each of the advertising contracts, and scheduling an advertising line under the contract having the highest value per impression at a next available advertising window.

OVERVIEW

U.S. Provisional Application No. 60/507,031, filed Sep. 29, 2003, is incorporated by reference herein in its entirety.

Because delivery of impressions under Class II contracts can be delayed at the publisher's whim in order to service a more profitable advertiser (or group of advertisers), it is advantageous to allow over-scheduling to provide some competitive pressure on prices. (Here, "competitive pressure" refers to pressure on the sponsors or customers to pay a higher CPI, CPC or CPA.) Permissible over-scheduling may include any combination of (1) Class I advertising less than or equal to the total amount of advertising space inventory, plus (2) any amount of Class II advertising.

Class II prices are generally lower than Class I, so Class II advertisers are capable of purchasing impressions in much larger numbers than Class I advertisers. Also, in Class II, generally the bigger advertising contracts have lower values per impression. That is, the expected value to the publisher per advertisement shown decreases as the purchase size increases. In this environment (overselling, bigger-is-cheaper), ideal behavior would be delivering the advertising having the highest expected return per impression first. However, because the inventory is oversold, and the biggest contracts are the hardest to satisfy, using the system of the prior art, the biggest contracts were served first. This means that the lowest value contracts were serviced before the higher value ones.

One exemplary embodiment described herein delivers Class I and Class II advertisements with different priority schemes. In the example with both Class I and II advertisements, Class I advertisements continue to be delivered by the most-behind-first method described above. Another exemplary embodiment only handles Class II advertising. In both of these examples, Class II advertising is delivered in a highest-value-first manner. To fairly compare the values of CPI, CPC and CPA contracts, an effective CPI value is estimated for every CPC and CPA contract.

Definitions click bounty—revenue paid per click.

conversion bounty—revenue paid per conversion (acquisition).

CTR—click through rate, or clicks per impression

CVR—conversion rate-conversions per click

Figure 1:
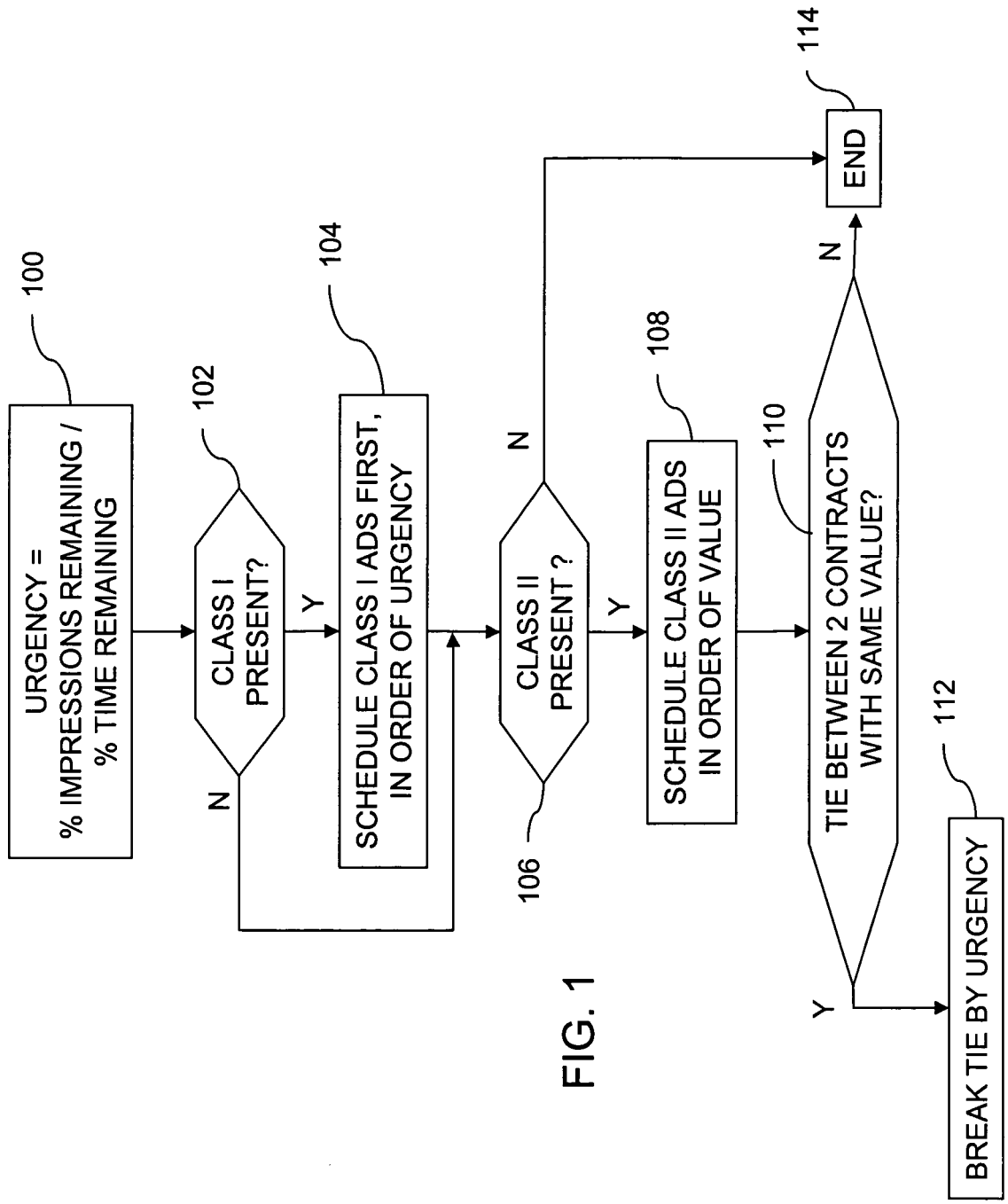
FIG. 1 is a flow chart diagram of a method of scheduling advertisements with multiple classes.

FIG. 1 is a flow chart diagram of an exemplary method for scheduling advertisements in a system having at least two classes of advertisements.

At step 100, the urgency of the advertisements is calculated. Urgency is a measure of how far behind schedule the delivery of the advertisement is. The measure of urgency may be the fraction of impressions remaining to be served divided by the fraction of time remaining to fulfill the contract.

At step 102, a determination is made whether there are any Class I (guaranteed) impressions (advertisements) to be delivered.

At step 104, if there are Class I impressions to be delivered, then the Class I impressions are scheduled in order of urgency. If a large number of impressions are to be served for a given line, the total number of impressions to be served is divided into periodic groups over the period of time in which the impressions are guaranteed to be rendered.

At step 106, a determination is made whether any Class II (preemptible) advertisements are to be served.

At step 108, the Class II advertisements, if present, are scheduled in order of value per impression. If there are more Class II contracts available than it is possible to fulfill, only the Class I contracts plus a subset of the Class II contracts having the highest value per impression are fulfilled.

At step 110, if there is a tie between two (or more) Class II contracts having the same value per impression, then at step 112, the tie is broken by scheduling the advertisement having the greater urgency first. This is to say that Class II lines of equal value compete with each other like Class I lines compete.

If there are no Class II advertisements, or if there is no tie between any Class II contracts, then the program ends at step 114.

Figure 2:
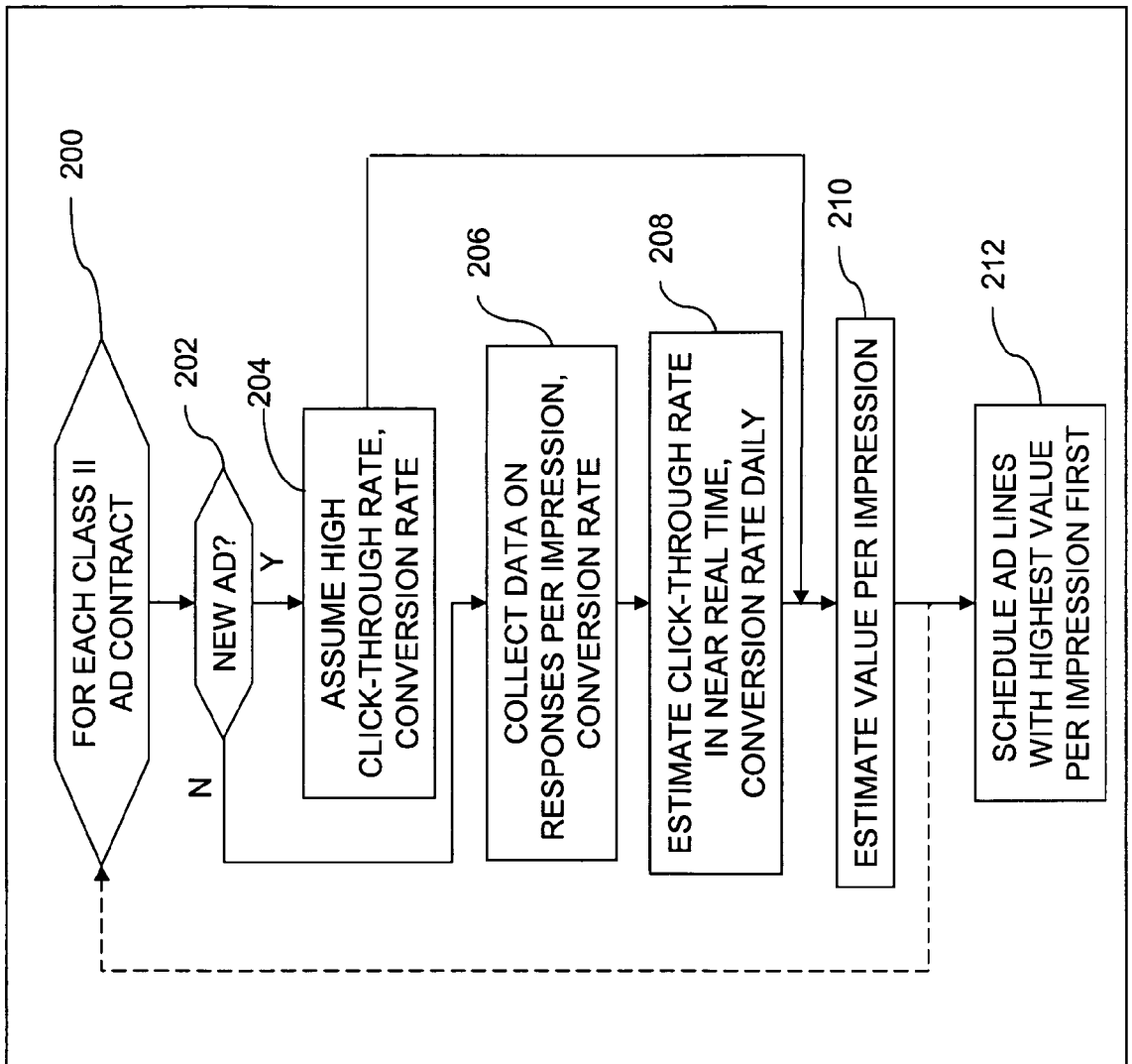
FIG. 2 is a detailed diagram of the Class II scheduling step shown in FIG. 1.

FIG. 2 is a flow chart showing details of the Class II scheduling step 108 in FIG. 1.

At step 200, a loop including steps 202-210 is performed for each Class II advertisement.

At step 202, a determination is made whether this is a new advertisement. For this purpose, "new" includes any advertisement for which an insufficient number of impressions have been rendered to accurately estimate the click-through rate and/or the conversion rate.

At step 204, if the advertisement is new, a predetermined, relatively high click-through rate is assumed. In the case of a CPA contract, a predetermined, relatively high conversion rate is also assumed. Then, step 210 is executed next.

At step 206, if the advertisement is not new, data on responses (clicks and/or acquisitions) per impression are collected as advertisements are rendered.

At step 208, the click-through rate is estimated in near real-time as impressions are rendered. The CTR is calculated in near real-time from the last previously scheduled set of impressions served for that contract. Also, the CVR is estimated daily for CPA contracts (or at another predetermined interval that is preferably longer than the period needed to accurately estimate the click through rate).

At step 210, the value per impression is estimated. The CTR (the assumed CTR for a new contract, or the most recently estimated CTR for a contract that is not new) is multiplied by the click bounty for a CPC contract, or by the product of the conversion bounty and the CVR for a CPA contract.

At step 212, after the loop of steps 202-210 is repeated for each Class II contract, the advertisements are scheduled so that the advertisements having the highest value per impression are scheduled first.

DETAILED DESCRIPTION

Estimating Value

In order to deliver Class II advertisements based on highest expected value, the ad system calculates the expected value per impression. This is done in different ways for each of the three different payment types (CPI, CPC, CPA). For CPI deals the estimation is trivial: The expected value is the CPI specified in the contract, i.e., no estimation is required. The following equation is used:

Est. Value (CPI)=CPI (cost per impression)

For CPC deals, the following equation is used:

$$\text{Est. Value}(CPC) = (\text{click bounty}) * (\text{click through rate or "}CTR\text{"})$$
$$= (\$/\text{click}) * (\text{clicks}/\text{impression})$$

For CPA deals, the following equation is used:

$$\text{Est. Value}(CPA) = (\text{conversion bounty}) * (\text{conversion rate}) * CTR$$
$$= (\$/\text{conversion}) * (\text{conversions}/\text{click}) *$$
$$(\text{clicks}/\text{impression})$$

Click bounty is defined as dollars per click. Conversion bounty is defined as dollars per conversion. CTR is defined as clicks per impression. Conversion rate is defined as conversions per click. Expansion and cancellation of the units in the above equations show that in all three cases, the result is a quantity specified in dollars/impression. From the above equations, it is clear that to estimate value for a CPC contract, CTR must be estimated; and for a CPA contract, CTR and CVR must also be estimated.

Estimating CTR

In the exemplary system, priorities are calculated in near real-time. The expected value (expected cost per 1000 impressions or eCPM) is calculated by the system using the above three equations. CTR is estimated for each individual contract in near real time by the system by looking at a window of the past click behavior. This is accomplished by maintaining a system of "buckets". Each bucket represents the number of clicks that have occurred in a fixed number of page views or impressions (scale).

Figure 3:
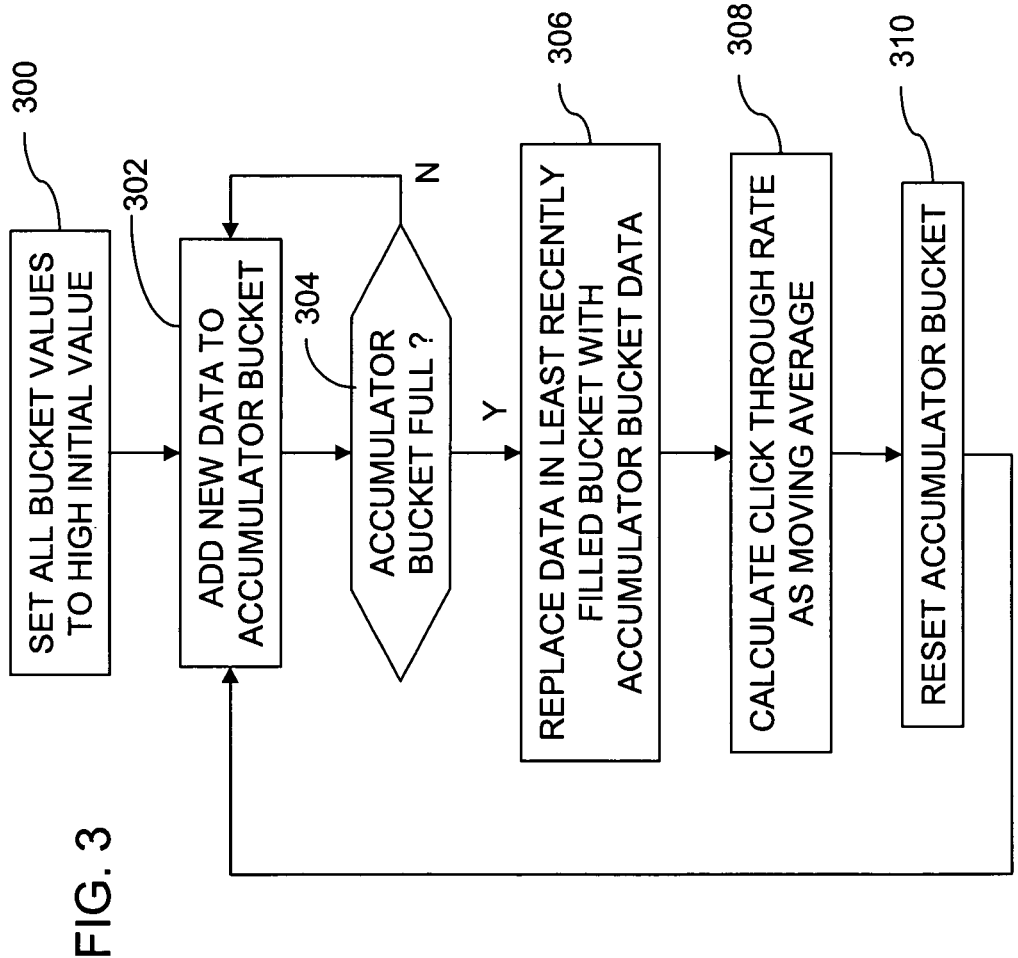
FIG. 3 is a flow chart diagram of the click through rate calculation step of FIG. 2.

FIG. 3 is a flow chart diagram of an exemplary method for calculating the click through rate for a single advertising line. It will be understood that this process is carried out individually for each advertising line.

At step 300, upon the addition of a new advertising line, all of the bucket values (number of clicks in each bucket) for that advertising line are set to a high initial value, corresponding to a high click through rate. For example, bucket values corresponding to a 1% click through rate may be used. (The number of clicks per bucket corresponding to a particular click through rate is proportional to the size of the bucket.)

At step 302, new data are added to a separate accumulator bucket, which is the same size as the rest of the buckets. The accumulator bucket includes a counter for the number of impressions and a counter for the number of clicks from those impressions. The accumulator bucket stores the most recent impression and click data until a complete "bucket full" of data are collected.

At step 304, the number of impressions in the accumulator bucket is compared to the fixed bucket size. If the accumulator bucket is not full (the number of impressions is less than the size of the buckets, then at step 302, additional results of impressions are added to the accumulator bucket. When the number of impressions in the accumulator bucket reaches the bucket size, then step 306 is executed.

At step 306, the data in the least recently filled bucket are replaced with the data in the accumulator bucket, so that the buckets form a circular buffer. The time stamp of the least recently filled bucket is updated to reflect its current update time and date, so that the second least recently filled bucket now becomes the least recently filled bucket.

At step 308, the click through rate is calculated from the total number of clicks across all the buckets (except the accumulator bucket) divided by the total number of impressions across all the buckets (except the accumulator bucket).

At step 310, the accumulator bucket values are reset to zero, so that a new set of impressions can be added to the accumulator bucket at step 302.

For example, each bucket may have the results of 10,000 page views. N buckets (e.g., 10 buckets) are used as a circular buffer, and an additional bucket is used as a temporary accumulation space. Impressions and clicks are counted, and stored in the $N+1^{th}$ bucket (accumulation space). Each time one bucket's worth of impressions are delivered, the next logical bucket in the circular buffer is filled with the accumulated clicks and the temporary click and impression counts in the $N+1^{th}$ bucket are set to zero. The click through rate can be calculated at any time by summing the clicks in the buckets and dividing by (N* number of impressions per bucket). In the exemplary system 10 buckets representing 10,000 impressions each are used. This means that the advertising system looks at the last 100,000 impressions for a given contract to determine CTR.

When a contract first begins, there are no delivery data on which to base a CTR estimation. Because the exemplary system always delivers the advertisements in the queue having the highest expected CPI, it would not be satisfactory to pre-load every bucket with zero's and assume an initial CTR of zero (That would prevent a new advertisement from ever being delivered by the system).

In the exemplary embodiment, the buckets are pre-filled with some pre-determined, high-valued CTR. For example, an initial CTR of 1% may be assumed, so that each bucket of 10,000 impressions is initially assigned 100 clicks. This allows a contract to initially assume a high CTR (and thus high estimated value) and allows new contracts to get started. Each time a bucket of impressions (e.g., 10,000 impressions) are served, the contents of the bucket having the oldest data are replaced with the clicks in the $N+1^{th}$ bucket (the temporary bucket). With this method, by the first (N*bucket size) impressions (100,000 in this example), the CTR has fallen to the actual CTR. After the first (N*bucket size) impressions, CTR is calculated as a moving average based on actual performance data, with the calculation performed each time a bucket of impressions is served.

For example, assume an advertisement for which there are about 10 clicks per 100,000 impressions. In that case the actual CTR is 0.1%, but because the CTR is not known a priori, the initial estimate of 1.0% is used. After the first 10,000 impressions, the estimated CTR is about (9*100+1*10)/100,000=0.91%. After the second 10,000 impressions, the estimated CTR is about (8*100+2*10)/100,000=0.82%. After the third 10,000 impressions, the estimated CTR is about (7*100+3*10)/100,000=0.73%. This continues until the tenth group of 10,000 impressions is rendered, at which point the estimated CTR will be about (10*10)/100,000=0.1%. Thereafter, the CTR will be based completely on empirical data, and the initial assumptions have no further impact.

Estimating CVR

CVR is calculated offline, once per day by the scheduling system. This estimated CVR is generated by:

$$CVR=(\text{conversions to date})/(\text{clicks to date})$$

The scheduling system, combines this quantity with the CPA once per day to generate a virtual click bounty with the following equation:

virtual click bounty=$CVR*CPA$=(conversions/clicks)*
(cost/conversion)

Thus, CPA contracts are calculated using the algorithm for CPC contracts by the advertising system, with the result multiplied by the cost per conversion.

Initial CVR

The number of conversions and clicks to date will always be zero at the beginning of a contract. This makes CVR and the virtual click bounty undefined (because they are computed by ratios having the number of clicks in the denominator). To deal with this initial condition, CPA deals are given a "grace period" (e.g., 2 weeks) during which a default value of CVR is used. This default is set reasonably high so that the contract is assigned some delivery by the system. At any point during the grace period, if some conversions are captured then the "true" CVR is calculated. If the grace period expires without conversions being entered, the CVR falls to zero.

Figure 4:
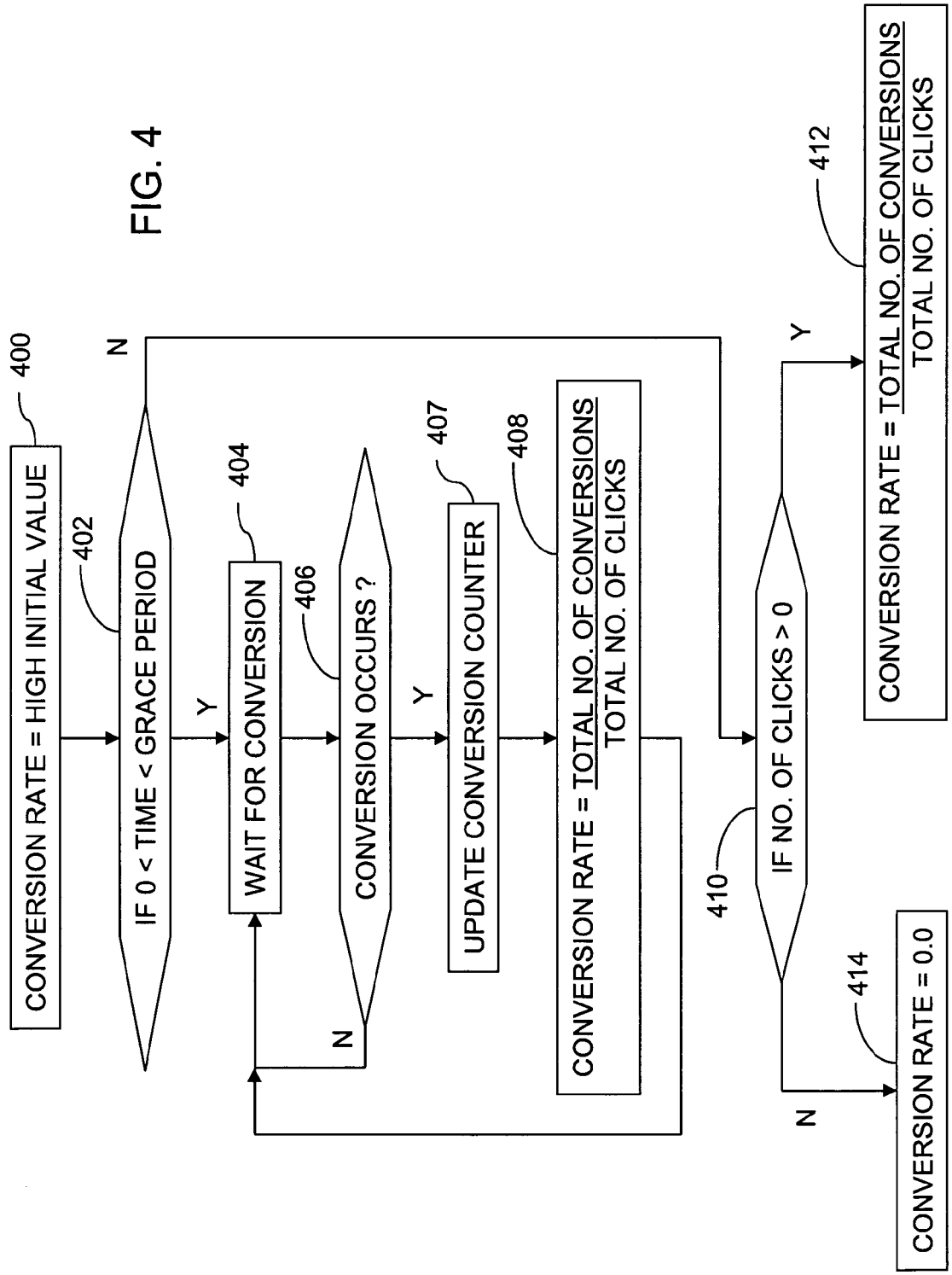
FIG. 4 is a flow chart diagram of a method for calculating the conversion rate.

FIG. 4 is a flow chart diagram of an exemplary method of calculating the conversion rate for a single advertising line. It will be understood that this process is performed individually for each advertising line.

At step 400, the conversion rate is initialized at a sufficiently high initial value that the advertising line will be scheduled by the system.

At step 402, steps 404-408 are repeated while the time (since introduction of the advertisement) is less than the grace period.

At step 404, the system waits for a conversion and maintains two counters for this advertisement: a counter for clicks and a counter for conversions.

At step 406, when a click occurs (or an impression is rendered), but no conversion occurs, then step 402 is performed, and the system continues to wait for a conversion. When a conversion occurs, step 408 is executed.

At step 407, once a first conversion occurs, the counter for the number of conversions is updated with each conversion.

At step 408, the conversion rate for the advertisement is calculated as the total number of conversions divided by the total number of clicks for the advertisement since it was first rendered. In preferred embodiments, the counters are incremented each time a conversion occurs, but the conversion rate CVR is only updated at a fixed interval, such as on a daily basis. In some embodiments, the period between CVR updates coincides with the scheduling period for advertisements. In other embodiments, after the first conversion, the conversion rate can be updated with each conversion, or with each click. It will be understood that only updating CVR with each conversion will produce higher estimates of CVR in between conversions, and updating the conversion rate with each click will cause CVR to drop to lower levels whenever a long period passes between conversions.

After the end of the grace period, step 410 is executed. At step 410, if there have been no clicks by the end of the grace period, step 414 is executed. Otherwise, step 412 is executed.

At step 412, CVR is calculated as the total number of conversions divided by the total number of clicks for the advertisement since it was first rendered.

At step 414, if have been no clicks, then the conversion rate is assigned a value of 0.0.

In the exemplary embodiment, the system tries to deliver only as many advertisements as the advertiser wants delivered. However, CPC and CPA advertisers do not order specific numbers of impressions; the advertiser either orders a number of clicks (for a CPC contract) or a number of acquisitions (for a CPA contract). To serve up a number of impressions that is likely to result in the desired number of clicks for a CPC contract (or acquisitions for a CPA contract) the publisher uses the estimated CTR to determine the expected number of impressions to serve in order to meet the desired number of clicks or acquisitions.

In addition, many contracts specify a period over which the impressions are to be rendered (e.g., a day, a week or a month). The exemplary system divides the expected number of impressions for the contract into a plurality of relatively short intervals. For example, a week's worth of advertisements may be divided into 336 half-hour intervals). The system tries to deliver the advertisements smoothly. In a preferred embodiment, the 336 half-hour intervals are weighted by the relative traffic patterns on the site. For example, 3:30 AM might get 1000 impressions while 1:00 PM might get 5000.

The number of clicks scheduled in any given interval is given by:

$$\text{(clicks this period)} = \frac{\text{(clicks remaining)} * \text{(weight of this period)}}{(CTR) * \text{(sum of all remaining period weights)}}$$

The number of advertisements to be rendered in any given half-hour interval is determined by the number of clicks or acquisitions yet to be obtained, the current estimate of the CTR, and the weights of the remaining half-hour intervals. This produces a self-regulating effect. Because the estimated value per impression for both CPC and CPA contracts is proportional to the estimated CTR, an overly high initial estimate of the CTR causes an advertisement to jump ahead of other advertisements that actually have a higher value, but a smaller number of impressions are rendered than would be rendered if the initial estimate of CTR is closer to the actual CTR. Thus, higher value advertisements are not crowded out.

In an alternative embodiment, all intervals have the same weight. For example, if one million impressions are required in a week, the alternative system will schedule about 3000 advertisements in each of the 336 half-hour intervals, and will not schedule one million in the first half hour.

Figure 5:
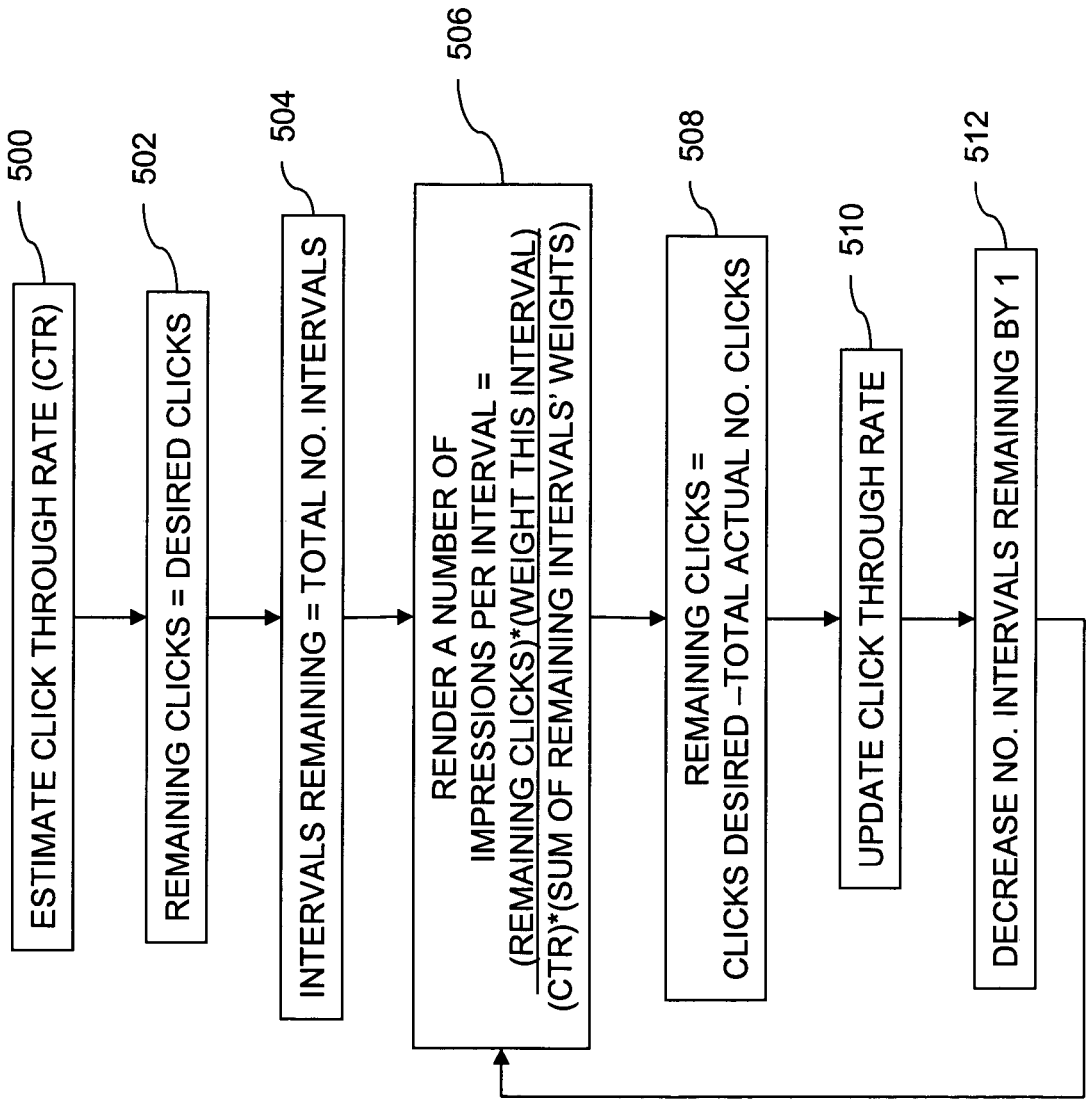
FIG. 5 is a flow chart diagram of a method for determining the number of impressions to be rendered during each scheduling interval.

FIG. 5 is a flow chart diagram of an exemplary method for setting and adjusting the number of impressions to be rendered per time interval for a given advertisement.

At step 500, when the advertisement is first delivered, an estimated click through rate is used for the initial period(s).

At step 502, the remaining clicks to be rendered for a new advertisement is set to the number of desired clicks.

At step 504, the number of intervals remaining is initialized at the total number of intervals for the amount of time in which the advertisement impressions are to be delivered. Thereafter, the click through rate, remaining clicks, and the number of intervals remaining are updated periodically, e.g., after each scheduling interval, or daily.

At step 506, the number of impressions to be rendered during the next scheduling interval is assigned a value of:

$$\text{(clicks this period)} = \frac{\text{(clicks remaining)} * \text{(weight of this period)}}{(CTR) * \text{(sum of all remaining period weights)}}$$

At 508, after the impressions are rendered, the number of remaining clicks is set equal to the original total number of clicks desired minus the total actual number of clicks to date for the advertising line.

At step 510, the CTR estimate is updated, based on the total number of clicks in the most recent time intervals divided by the number of impressions in the N buckets (described above with reference to FIG. 3).

At step 512, the number of intervals remaining is decremented by one.

Thereafter, the loop of steps 506-512 is executed to render the appropriate number of impressions, and update the remaining number of clicks to be obtained, CTR, number of intervals remaining, and number of impressions per interval.

The self regulating affect is apparent from FIG. 5. If the CTR estimate is too high, the number of impressions rendered in the first interval is too low. Although the ad line jumps ahead of more profitable ads, only a small number are scheduled. Then the number of remaining clicks stays higher than it would be (if the correct CTR had been used), and the next CTR update (as shown in FIG. 3) reduces the current CTR estimate based on the small number of clicks observed. As a result the number of impressions rendered in the next interval increases.

On the other hand, if the CTR estimate is too low (but not so low as to completely prevent any impressions from being delivered), the number of impressions rendered in the first interval is higher than if the correct CTR is applied. Although the ad line is not delivered until after less profitable ads, a larger number of impressions are scheduled for the profitable ad. Then the number of remaining clicks drops lower than it would be (if the correct CTR had been used), and the next CTR update (as shown in FIG. 3) increases the current CTR estimate based on the large number of clicks observed. As a result, the number of impressions rendered in the next interval decreases.

Consider the example mentioned above with reference to FIG. 3, in which the initial estimate of CTR (1%) is ten times the actual CTR (0.1%); then the number of impressions rendered in the first half hour is ten times smaller than the number actually needed to service the contract. Thus, there is less danger of swamping the system with an overvalued advertisement contract for which the estimated CTR is too high. When an initial estimate of CTR is too high, the advertisement is served sooner than it should be, but only a relatively small number of impressions are delivered in the first half hour the advertisement is run. When enough empirical data is available to reliably estimate CTR, and the much smaller value of CTR is used, the system recognizes that ten times as many impressions are needed if the advertisement is to be run, but the system also recognizes that this advertisement has a much lower value per impression. Thus, the advertisement may be preempted if there are other advertisements available with higher value per impression.

Although an example is provided in which the schedule for a contract is adjusted every half hour, other intervals may be used. In particular, if very large numbers of impressions are to be scheduled per unit of time, then the scheduling interval may be smaller. Preferably, a scheduling interval is selected that is long enough to render about (N*the bucket size) impressions. If the number of impressions rendered during the interval is orders of magnitude greater than (N*the bucket size), then the circular queue wraps around tens or hundreds of times during the interval. In that case, most of the history is discarded, and only the last (N*the bucket size) data are considered for estimating CTR and scheduling advertisements for the next interval.

In some embodiments, the scheduling interval is not adjusted, but either N or the bucket size B is adjusted if the number of impressions to be rendered is much greater than B*N. Thus, initially N*B may be 100,000, but after a predetermined number of intervals in which the number of impressions far exceeds 100,000, either N or B is doubled. This process can be repeated until N*B is of the order of magnitude of the number of impressions served during the interval.

As noted above, in some embodiments, Class I advertising agreements are also entered, in addition to Class II. When Class I advertising is also performed, the system attempts to smoothly deliver the advertisements for the class I contracts by dividing the sold advertisements into several relatively small groups (e.g., 100,000 impressions), and delivering one group during each scheduling interval (e.g., every half hour). To the extent that any one of these scheduled groups is delayed, the advertisement becomes behind schedule. Class I advertising is not, however, performed ahead of schedule. That is, if a Class I advertisement runs every half hour, once the ad has been run for a half hour period, the system waits until the next half hour period before running that ad again.

In the exemplary system, Class I advertisements are prioritized by how far behind schedule they are. There are a variety of alternative techniques for determining how far behind a line of advertising is. In the exemplary embodiment, a normalized measure is used: the percentage of the total contract remaining divided by the percentage of time remaining to deliver the advertisements. For example, if 50% of the impressions for a contract are still remaining to be rendered, and 25% of the duration of the contract remains, then the measure of urgency (or how behind the contract is) would be 50/25=2. Another contract having 50% of its advertising lines remaining to be run in 12.5% of the time of the whole contract would have an urgency of 50/12.5=4. The more data to be delivered in a short time, the greater the urgency. When a Class I contract catches up with its schedule, then its urgency value is 1.0 (e.g., 50% of the impressions still remaining to be rendered in 50% of the contract duration, or 25% of the impressions still remaining to be rendered in 25% of the contract duration.).

In the exemplary system including both Class I and Class II advertising, there are three mechanisms for prioritization.

The first mechanism is class. When both Class I and Class II are available to be currently scheduled, the Class I advertisements are rendered first. If there are no Class I advertisements (or the only Class I advertisements have an urgency of less than or equal to 1.0, and are thus scheduled to be delivered in the future), then Class II advertisements can be run. Although the exemplary embodiment includes only two classes, a system may include more than two classes (e.g., ten).

The second mechanism is rank. Rank is a measure of value. In the example, rank is irrelevant for Class I (or any guaranteed class of advertising), because the advertisements are guaranteed to be run regardless of value. In the case of Class II advertising, as described above, all lines of advertising are assigned a rank in terms of an expected value per impression.

The third mechanism is urgency. With Class I, where all advertisements have the same class and rank, urgency is the primary mechanism of ordering the lines of advertising for delivery. As described above, urgency may be measured as percentage of impressions remaining to be delivered divided by percentage of contract duration remaining. This normalized measure is advantageous, because it puts contracts having a large total number of impressions on the same footing as contracts that have a small total number of impressions. This is reasonable, because all of the Class I advertising is guaranteed, regardless of size. In other embodiments, different methods of calculating urgency may use used, such as the number of impressions overdue, or the length of time that the most overdue impression is late.

Within Class II advertisements, urgency may come into play if two different class II contracts have the same (or substantially the same) value per impression. If the difference in value per impressions for two contracts is less than a threshold (e.g., one tenth or one hundredth of a cent), then the urgency would be used as the deciding factor in determining which advertisement to run first.

Figure 6:
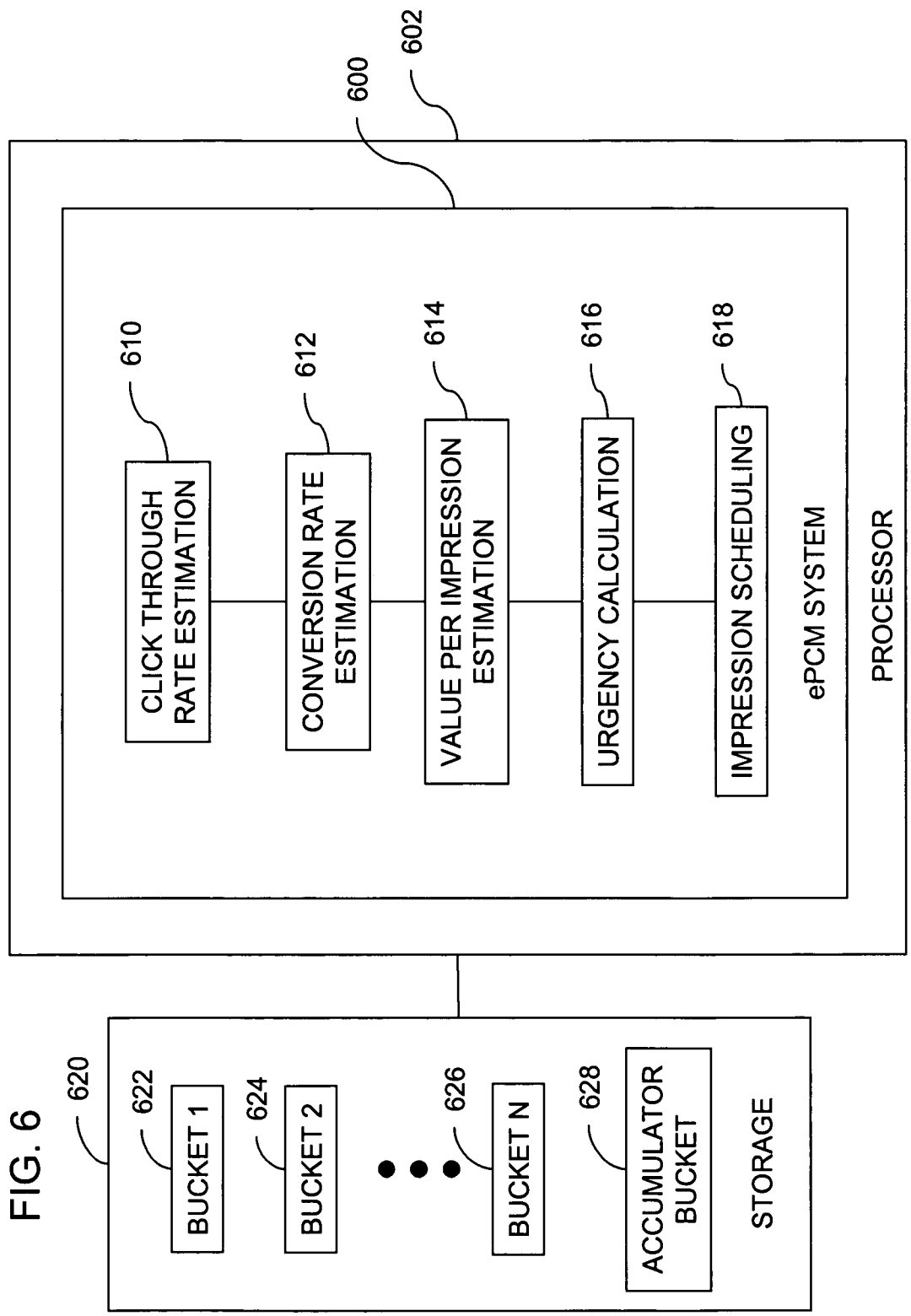
FIG. 6 is a block diagram showing an exemplary ePCM system for performing the method of FIGS. 1-5.

FIG. 6 is a block diagram showing an exemplary ePCM system 600 for performing the functions described above. The system 600 may be hosted on any general purpose processor 602. The functions of the ePCM system include click through rate estimation 610, conversion rate estimation 612, value per impression estimation 614, urgency calculation 616 and impression scheduling 618. The processor has access to a storage medium 620, in which the click data buckets 622-626 and the accumulator bucket 628 are stored.

With the deployment of the eCPM system, both problems of the prior art (poor scheduling and inappropriate mix of advertisements) are solved. The Class II inventory no longer needs to be constrained, because the "optimal" contracts are always selected first. In addition, because the highest value contracts are selected first, the system creates an implicit reinforcement for good data entry by salespeople (in terms of estimating the value of a Class II contract). Salespeople and sale operations managers will be motivated to insure that campaign values are appropriately tracked because when they fail to do so (by initially overestimating the click-through rate), their campaigns often stop, due to an insufficient number of impressions being generated to ensure continued scheduling of impressions. The exemplary system makes estimation of value easier and more accurate.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, "ZIP™" disks, memory sticks, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the invention should be construed broadly, to include other variants and embodiments, which may be made by those skilled in the art without departing from the scope and range of equivalents of the appended claims.

What is claimed:

1. A computer-implemented method for scheduling advertising, comprising the steps of:
   estimating, by a processor, a respective fraction of delivered advertisement impressions that result in a response from a user for each of a plurality of advertising contracts, wherein each advertising contract identifies a number of responses to be obtained over a period of time comprising a plurality of time intervals;
   estimating, by a processor, a value per impression for each of the advertising contracts, wherein the value per impression is estimated in near-real time, and
   scheduling, by a processor, an advertising line under the contract having the highest value per impression at a next available advertising window, wherein a number of impressions of the advertising line to be delivered during the next available advertising window is determined by a number of desired responses yet to be obtained for the advertising contract, a real-time estimate of a fraction of the impressions of the advertising line that elicit a response from the user, and a weight assigned to each remaining time interval of the period of time within which the number of responses under the advertising contract is to be obtained, each weight being based on an estimated relative traffic pattern for each remaining time interval.

2. The computer-implemented method of claim 1, wherein the value per impression is estimated based on a moving average representing a fraction of trials in which an impression is delivered and the user responds to the impression.

3. The computer-implemented method of claim 1, wherein the number of impressions to be delivered during the next available advertising window is further determined based on a desired number of responses and an estimate of a fraction of the impressions that elicit a response from the user.

4. The computer-implemented method of claim 1, wherein a sufficiently high value per impression is initially assumed for a new advertising contract, so as to ensure that sufficient trials are performed under the new contract to form an accurate estimate of the value per impression.

5. The computer-implemented method of claim 1, wherein each remaining time interval is associated with a time of day and the weight assigned to each remaining time interval is based on an average number of impressions delivered during the time of day on a plurality of previous.

6. The computer-implemented method of claim 1, wherein each time interval of the plurality of time intervals comprises of a half hour time interval.

7. The computer-implemented method of claim 1, wherein, if two of the advertising contracts have substantially the same value per impression, an advertising line is scheduled under the one of the two contracts for which advertising delivery has a greater urgency.

8. The computer-implemented method of claim 7, wherein a measure of urgency for each contract is based on a ratio of a remaining fraction of the total impressions to be delivered under the contract divided by a remaining fraction of the total time during which the contract is to be fulfilled.

9. The computer-implemented method of claim 1, wherein the next available advertising window is a time period after which a guaranteed- delivery advertisement is scheduled.

10. The computer-implemented method of claim 1, wherein the advertising is transmitted electronically to a recipient using one of the group consisting of web pages, portions of web pages, banners, buttons, pop-up windows, placement within sponsored search listings, and streaming media.

11. A computer readable medium encoded with computer program code, wherein, when the computer program code is executed by a processor, the processor performs a method for scheduling advertising, comprising the steps of:
   estimating a respective fraction of delivered advertisement impressions that result in a response from a user for each of a plurality of advertising contracts, wherein each advertising contract identifies a number of responses to be obtained over a period of time comprising a plurality of time intervals;

estimating a value per impression for each of the advertising contracts, and scheduling an advertising line under the contract having the highest value per impression at a next available advertising window, wherein a number of impressions of the advertising line to be delivered during the next available advertising window is determined by a number of desired responses yet to be obtained for the advertising contract, a real-time estimate of a fraction of the impressions of the advertising line that elicit a response from the user, and a weight assigned to each remaining time interval of the period of time within which the number of responses under the advertising contract is to be obtained, each weight being based on an estimated relative traffic pattern for each remaining time interval.

12. The computer readable medium of claim 11, wherein the value per impression is estimated in near-real time based on a moving average representing a fraction of trials in which an impression is delivered and the user responds to the impression.

13. The computer readable medium of claim 11, wherein the number of impressions to be delivered during the next available advertising window is further determined based on a desired number of responses and an estimate of a fraction of the impressions that elicit a response from the user.

14. The computer readable medium of claim 11, wherein a sufficiently high value per impression is initially assumed for a new advertising contract, so as to ensure that sufficient trials are performed under the new contract to form an accurate estimate of the value per impression.

15. The computer readable medium of claim 11, wherein each time interval of the plurality of time intervals comprises of a half hour time interval.

16. The computer readable medium of claim 11, wherein, if two of the advertising contracts have substantially the same value per impression, an advertising line is scheduled under the one of the two contracts for which advertising delivery has a greater urgency.

17. The computer readable medium of claim 16, wherein a measure of urgency for each contract is based on a ratio of a remaining fraction of the total impressions to be delivered under the contract divided by a remaining fraction of the total time during which the contract is to be fulfilled.

18. The computer readable medium of claim 11, wherein the next available advertising window is a time period after which a guaranteed-delivery advertisement is scheduled.

* * * * *